April 26, 1966  E. E. JOINER  3,247,535
MACHINES FOR GROOVING PLASTIC HEELS
Filed Aug. 1, 1963 6 Sheets-Sheet 1

Fig. 1

*Inventor*
Edgar E. Joiner
By his Attorney
Douglas R. Buchanan

April 26, 1966 E. E. JOINER 3,247,535
MACHINES FOR GROOVING PLASTIC HEELS
Filed Aug. 1, 1963 6 Sheets-Sheet 5

United States Patent Office 3,247,535
Patented Apr. 26, 1966

3,247,535
MACHINES FOR GROOVING PLASTIC HEELS
Edgar E. Joiner, Andover, Mass., assignor to United Shoe Machinery Corporation, Boston, Mass., a corporation of New Jersey
Filed Aug. 1, 1963, Ser. No. 299,407
11 Claims. (Cl. 12—47.1)

This invention relates to machines for and methods of making plastic heels used in the manufacture of shoes. In the last few years wood heels have been replaced to a considerable extent by plastic heels which for various reasons well known in the art are generally considered superior to wood heels. Molds used in making plastic heels are expensive and unless a large number of heels of a particular size and style are to be manufactured the cost of such molds is not economically justified.

It is an object of the present invention to provide a machine for quickly and effectively grooving, that is, breasting molded plastic Louis heels so as to change the shapes of the breasts of said heels and accordingly the styles of the heels. With the above object and considerations in view applicant contemplates changing the style of a "standard" molded plastic Louis heel by removing material from the breast of the heel in a separate trimming operation thereby providing an improved heel making method by the practice of which molded high style heels may be manufactured in small quantities without entailing the expense of molds specifically adapted to form such plastic heels.

Machines such as disclosed in United States Letters Patent No. 1,860,789, granted May 31, 1932, on an application filed in the name of Willard N. Sawyer, for grooving wood heels of the Louis type have been proposed but such machines are not adapted to handle molded plastic heels during the above-mentioned grooving operation so as to change the style of the heel. In the manufacture of wood heels the grooving operation is usually the first operation and is performed on the wood heel block which at that time is flat sided and is usually handled in the machine disclosed in Patent No. 1,860,789 to form the step product shown in FIG. 15 of said patent. It will be appreciated that it is impracticable to handle a molded plastic Louis heel and to reshape its breast by the use of the machine disclosed in said Patent No. 1,860,789.

With the above object and considerations in view applicant has provided a new type of grooving machine comprising a powered rotary tool, a carrier, and in accordance with a feature of the invention means for locating a breast of a molded Louis heel in a predetermined position upon the carrier and for securing it in said position to the carrier, said carrier and said tool being mounted for relative bodily movement in a predetermined path whereby to cause material to be trimmed from the breast of the heel to change the profile of said breast.

The present invention consists in the above mentioned improvement in heel making methods and in the above and other novel features hereinafter described, reference being had to the accompanying drawings which illustrate embodiments of the invention selected for purposes of illustration, said invention being fully disclosed in the following description and claims.

Figure 1:
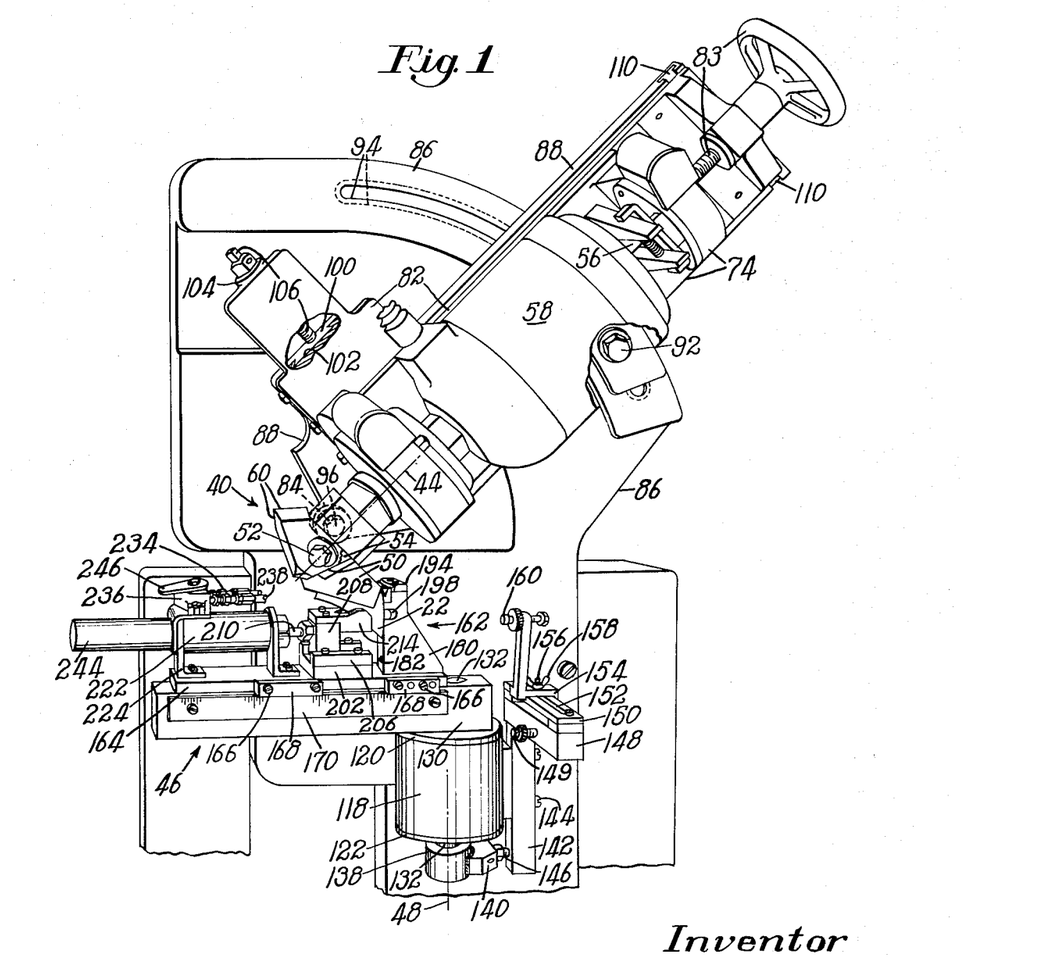
FIG. 1 shows in front elevation the illustrative machine in the process of changing a molded plastic full Louis heel to a Continental heel.
Figure 9:
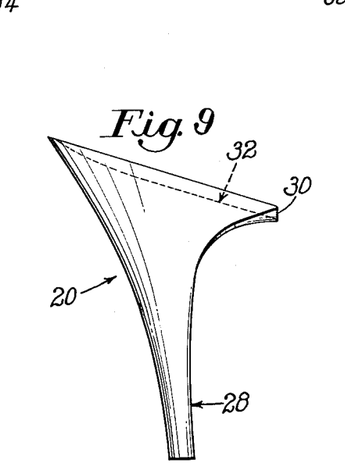
FIG. 9 is a side view of a molded plastic full Louis heel which is to be operated upon by the machine set up as shown in FIG. 1.
Figure 10:
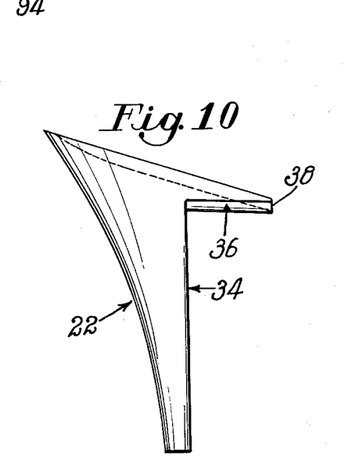
FIG. 10 shows in side elevation the heel of FIG. 9 after it has been grooved or breasted by the illustrative machine to form a Continental heel.
Figures 11, 12, 13, 14, 15:
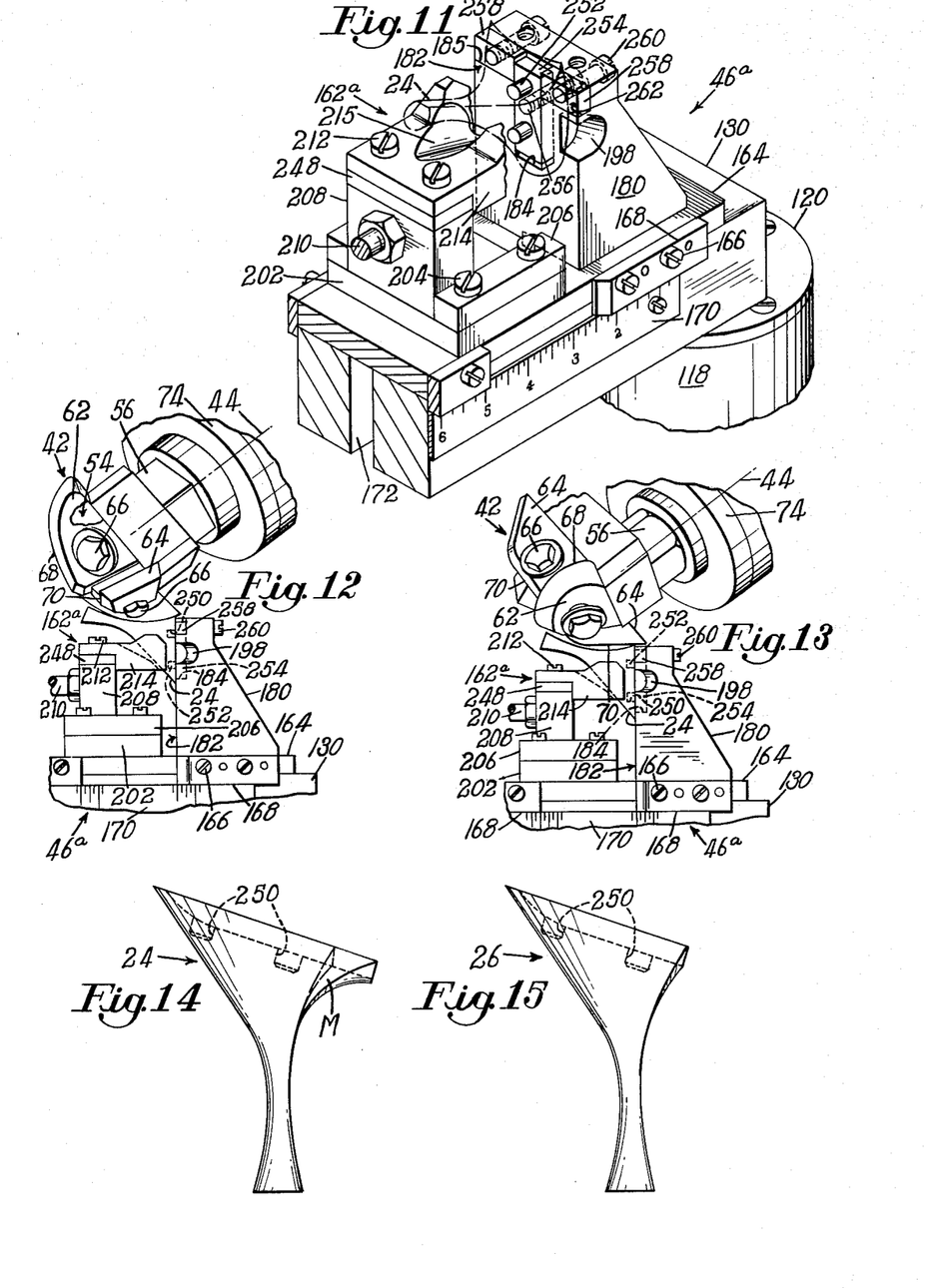
FIG. 11 is a perspective view showing the above mentioned heel carrier modified to accommodate a molded plastic half Louis heel shown in FIG. 14 preparatory to grooving or breasting the heel to form a quarter Louis heel such as is shown in FIG. 15.
FIGS. 12 and 13 are views showing details of a tool or cutterhead used in the machine set up to change half Louis heels to quarter Louis heels, profiling blades of the tools shown in FIG. 12 being shown in the process of profiling the upper end of the breast of the heel and facing blades of the tool or cutterhead shown in FIG. 13 being shown in the process of forming a smooth upper breast edge on the heel.
FIG. 14 is a side view of the molded plastic half Louis heel which is to have its breast trimmed to form the quarter Louis heel.
FIG. 15 shows in side elevation the quarter Louis heel formed from the half Louis heel shown in FIG. 14.

The present invention is described with reference to grooving or breasting a molded full Louis heel 20 (FIGS. 2, 6 and 9) to provide a Continental heel 22 (FIGS. 1, 3 and 10) and also with reference to grooving or breasting a molded half Louis heel 24 (FIGS. 11–14) to form a quarter Louis heel 26 (FIG. 15). The lower portion of the breast 28 (FIG. 9) of a full Louis heel is substantially planar, the upper portion of said breast curving upwardly and forwardly of the heel and terminating at the forward end of a projecting lip 30 at the attaching face 32 of the heel as distinguished from the Continental heel 22 in which the entire breast 34 of the heel is substantially planar and forms an angle of approximately 90° with a transversely convex lower face 36 (FIG. 10) of a forwardly projecting lip or shank lip portion 38 of the heel. As above explained, molds used in the manufacture of plastic heels, for example, are expensive and unless a large number of heels of a particular size and style are to be manufactured, the expense of the molds is not warranted. Accordingly, when it is desired to provide a limited number of Continental plastic heels 22 or quarter Louis heels 26 of a particular size and shape or style it is economically expedient to provide such heels by trimming molded full Louis and half Louis heels 20, 24 respectively as hereinafter explained.

The illustrative machine comprises tools or cutterheads 40 (FIG. 1), 42 (FIGS. 12, 13) rotatable about an axis 44 which may be initially adjusted into different operating positions, as will appear later, in accordance with the style of the heel to be grooved, and a heel carrier 46 (FIGS. 1, 2, 5, 6), 46a (FIGS. 11, 12 and 13) mounted for swinging movement about a fixed axis 48 to move the plastic full and half Louis heels 20, 24 respectively positioned in and secured to the carrier past the tool or cutter head 40, 42 to groove or breast the heels whereby to provide the Continental and quarter Louis heels 22, 26.

The tool 40 comprises a pair of profiling blades 50 (FIG. 1) which are secured by screws 52 to opposite faces of a rectangular-frusto-wedge 54 (FIGS. 1, 8 and 12) secured to a shaft 56 of a motor 58, each of the profiling blades having an angular profiling cutting edge 60. The tool 42 comprises alternately arranged pairs of profiling and facing blades 62, 64 which are secured by screws 66 to opposite pairs of faces respectively of the rectangular-frusto-wedge 54, the profiling blades 62 having convex profiling cutting edges 68 and the facing blades 64 having substantially straight cutting edges 70.

The motor shaft 56 is rotatable in bearings 72 (FIG. 8) in a yoke 74 to which the motor 58 is secured by screws 76. The yoke 74 has formed in it a dovetail guideway 78 in which fits a dovetail portion 80 (FIG. 8) of a cross slide 82. Journaled on the cross slide 82 and threaded into the yoke 74 is a hand screw 83 which may be initially rotated to raise or lower on the cross slide 82 the yoke 74 and accordingly the motor 68 and its associated tool or cutterheads 40, 42 into different operating positions lengthwise of the motor shaft. Supported on a fulcrum pin 84 secured to a main frame 86 of the machine is a mount 88 having a bore 90 in which fits a screw 92 extending into an arcuate slot 94 which is formed in the main frame 86 and is centered about an axis 96 of the fulcrum pin 84, said screw being threaded into a nut 98 which registers loosely in said slot. The cross slide 82 has formed in it a rectilinear guideway 102 adapted to register on a rectilinear dovetail guide portion 100 which is formed on the mount 88 and is disposed at right angles to the dovetail guide portion 80 of the cross slide.

Figure 8:
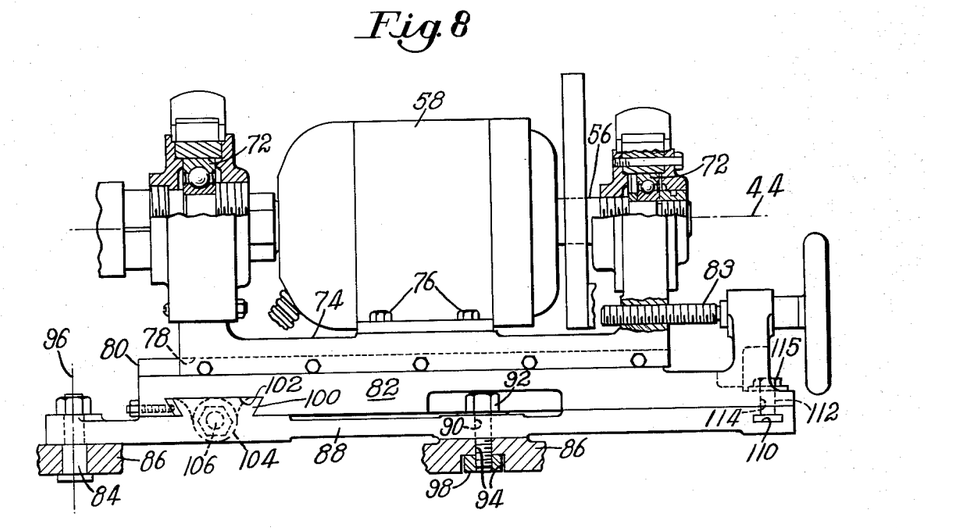
FIG. 8 is a view showing, partly in side elevation and partly in section, details of mechanism for supporting, operating, and initially orienting a tool or cutterhead of the illustrative machine.

The cross slide has a depending lug 104 in which is rotatably mounted a screw 106 threaded into the dovetail guide portion 100 of the mount 88. The mount 88 has formed in it an undercut guideway 110 arranged parallel to the dovetail guide portion 100 of said mount and mounted in the guideway 110 is a head of a screw 112 which fits in a bore 114 of the cross slide 82, said screw having threaded onto it a nut 115 normally securing the cross slide 82 in its adjusted position on the mount 88.

When it is desired to move the cross slide 82 on the mount 88 to a desired operating position the nut 115 is loosened on the screw 112, the screw 106 then being rotated causing the cross slide to be moved along the dovetail guide portion 100 of the mount. When the cross slide 82 has been moved to its desired position on the mount 88 the nut 115 is tightened on the screw 112 to maintain such adjustment. By the use of the above described adjustment the tools or cutterheads 40, 42 may be moved in a general plane to any operating position. By varying the shapes of the cutting edges of the various blades of the tools or cutterheads and by adjusting said tools or cutterheads into different operating positions it is possible to breast mold heels to different desired shapes. The tools or cutterheads 40, 42 may be described as being adapted to generate a surface of revolution having a cross section corresponding in part to a profile of a breast portion of a heel or to a Louis heel breast and shank lift profile.

The main frame 86 comprises a bearing housing 118 having secured to it by screws upper and lower cap plates 120, 122 serving to secure upper and lower ball bearings 124, 126 in the housing. Secured by a tapered pin 128 (FIG. 6) to the rear end portion of a beam 130 of the heel carrier 46, 46a is a vertical shaft 132 secured to inner races of the upper and lower ball bearings 124, 126. The shaft 132 extends a substantial distance below the bearing housing 118 and has secured to it by a set screw 136 a drum 138 the periphery of which is normally engaged by a brake shoe 140 mounted on a bracket 142 secured by screws 144 to the bearing housing 118, said brake shoe being adjustable on the bracket as will appear later, by the use of a nut and screw connection 146.

Figure 5:
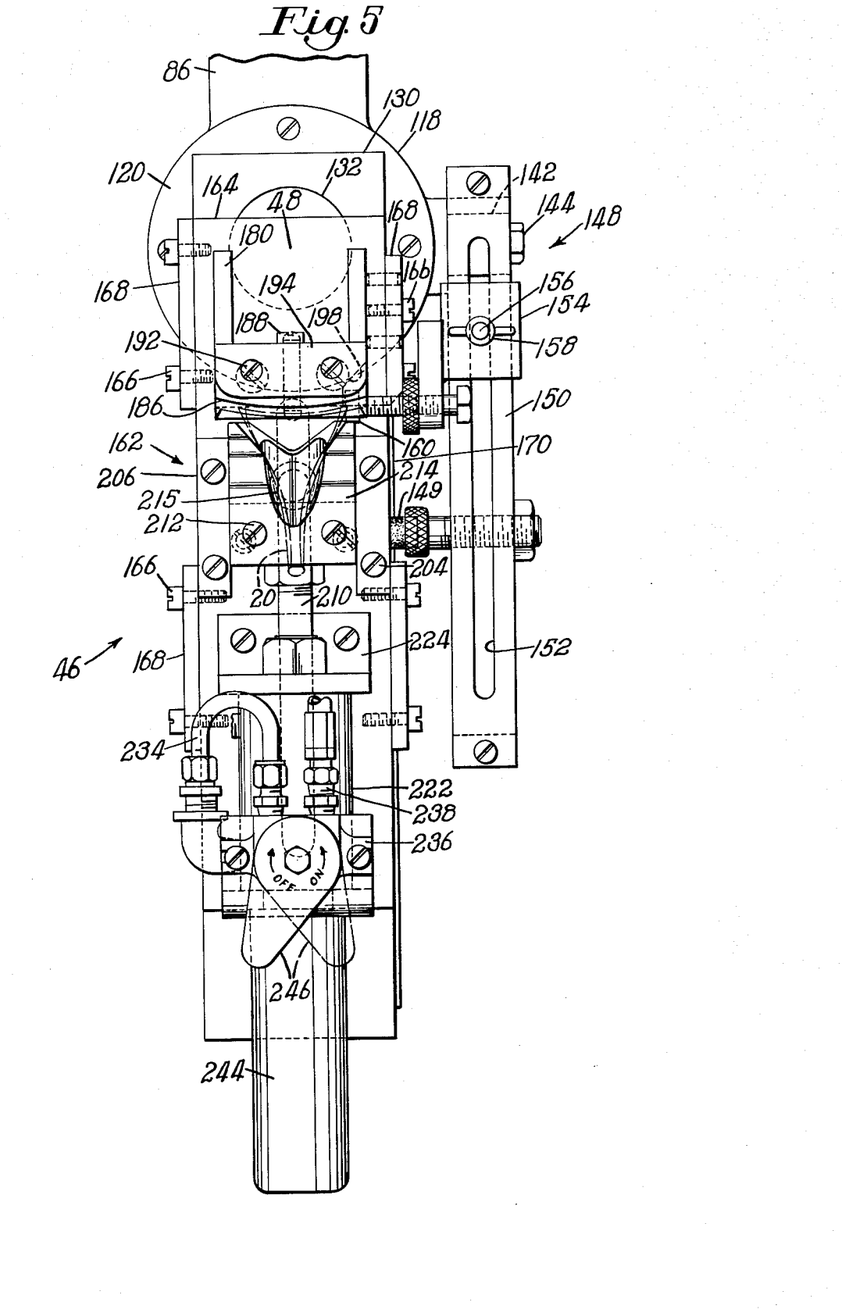
FIG. 5 is a plan view of the heel carrier shown in FIG. 2 in a loading and unloading position against a stop, a Louis heel being positioned on and secured to the carrier.
Figures 6, 7:
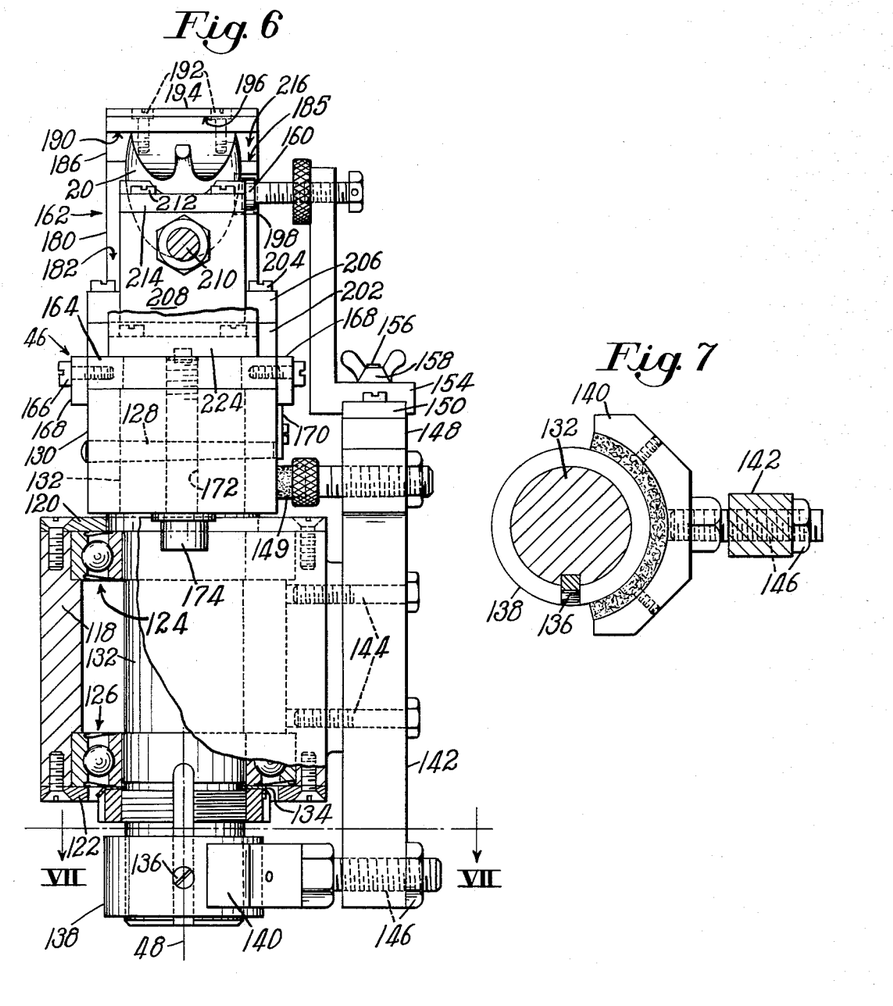
FIG. 6 is a view of the carrier and its supporting mechanism, partly in front elevation and partly in section on the line VI—VI of FIG. 2.
FIG. 7 is a section on the line VII—VII of FIG. 6 showing braking mechanism for the carrier.

Formed integral with the bracket 142 is a fixed gage holder 148 to which is adjustably secured a stop 149 engaged by the beam 130 of the carrier 46 as best shown in FIGS. 5 and 6 to locate the carrier in a work loading and unloading position. The gage holder 148 comprises an upper plate 150 which has formed in it an elongated slot 152 and has mounted for initial adjustment on it a slide 154 (FIGS. 1 and 5) carrying a screw 156 which extends upwardly through the slot in the plate and has threaded onto it a wing nut 158 normally forced against the upper face of the plate to secure the slide in a predetermined position to the gage holder. The slide 154 has an upstanding portion into which is threaded a side gage 160 serving roughly to position the full Louis heel 20 widthwise on the carrier 46 preparatory to power clamping the heel in said carrier. The side gage 160 may be moved into different operating positions on the slide 154 in accordance with the setting of hereinafter described heel positioning and clamping mechanism of the carrier, by loosening the wing nut 158 and moving the slide 154 to a desired position lengthwise of the slot 152. The side gage 160 may be initially adjusted on the slide 154 in accordance with the size of the Louis heel 20 to be accommodated. The stop 149 is seldom adjusted on the bracket 142. If such an adjustment is effected it is desirable to effect a corresponding adjustment of the side gage 160 on the slide 154.

The heel carrier 46 comprises the beam 130 and heel holders 162 (FIGS. 1, 2, 5 and 6), 162a (FIG. 11) upon which the heels 20, 24 respectively are positioned and clamped and each of which includes a base plate 164. The base plate 164 of the heel holders 162, 162a is of the same width as the beam 130 of said carrier 46 and has secured by screws 166 to its opposite sides, front and rear pairs of depending plates 168 which slidingly engage the sides of the beam, the lower end of the rear right plate, as viewed from the front of the machine in its idle position, extending along a scale 170 which is screwed to the beam. The beam 130 has formed in it a slot 172 (FIGS. 2, 6 and 11) through which passes a screw 174 threaded into the base plate 164 of the heel holder 162, 162a, the head of the screw normally being forced against the bottom of the beam 130 to clamp the base plate 164 and accordingly the associated heel holder securely to the beam after initial adjustment of the base plate on the beam has been effected.

Figures 2, 3, 4:
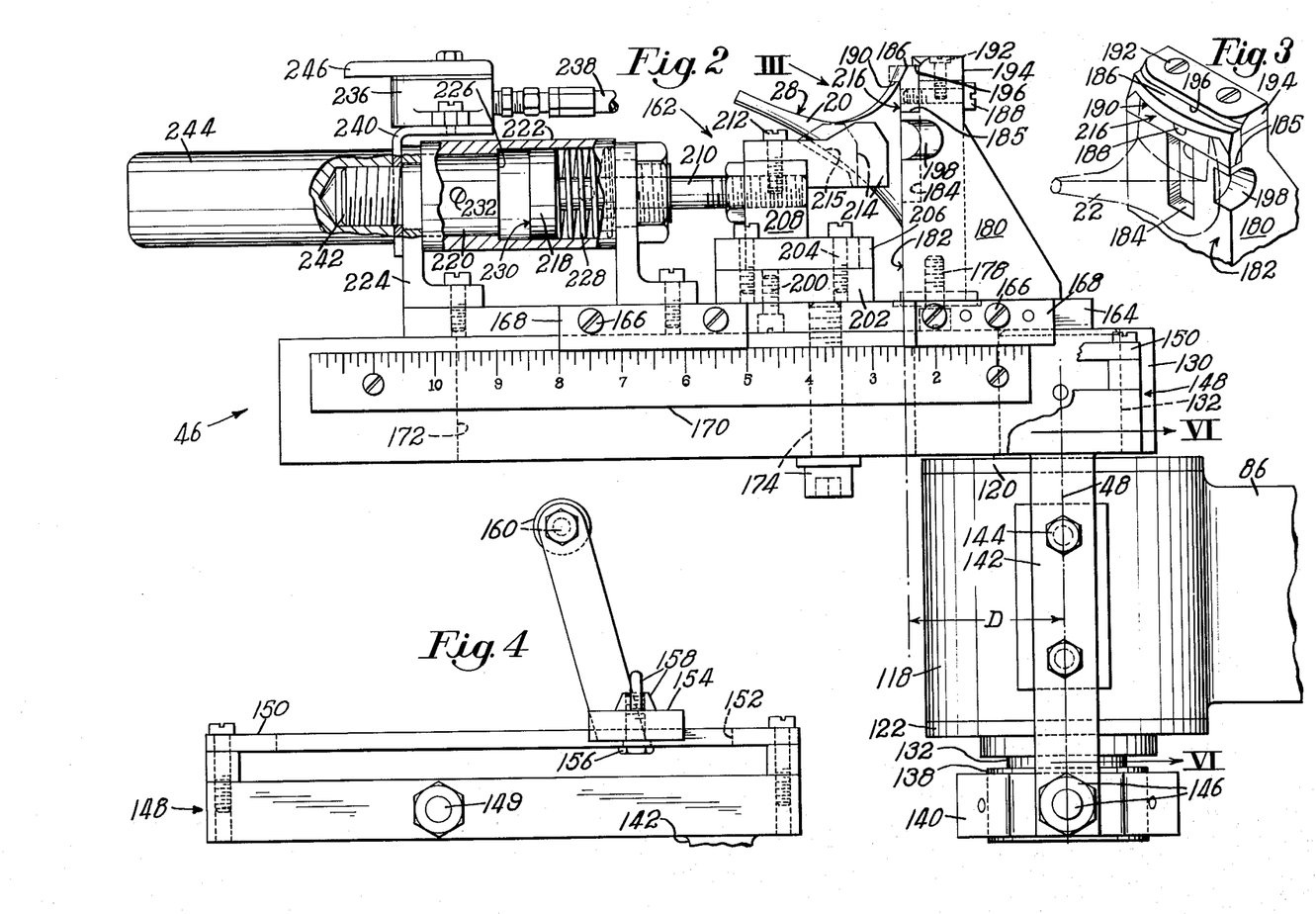
FIG. 2 is a side elevation, partly broken away and partly in section, of a heel carrier of the machine.
FIG. 3 shows in perspective, portions of heel supporting mechanism of the carrier, as viewed generally in the direction III of FIG. 2.
FIG. 4 shows in side elevation, a side gage, a carrier stop and a mounting therefor which has been broken away from the showing in FIG. 2.

Secured by screws 178 to the base plate 164 of the heel holder 162, 162a, is an upstanding abutment 180 having a planar front face 182 adapted to be engaged as shown in FIGS. 2 and 3 by the rim of the attaching face 32 of the full Louis heel 20 and, as will appear later, by the rim of the attaching face of the half Louis heel 24 as shown in FIG. 11. The abutment 180 has formed in its front face 182 a vertically disposed central slot 184 and lateral shoulders 185 at the upper end of the slot. Mounted on the shoulders 185 of the abutment 180 is a lip gage 186 which is secured by a screw 188 to the abutment 180 and has a face 190 adapted to be engaged by the forward end of the projecting lip 30 of the heel.

The abutment 180 has secured by screws 192 to its upper end a retaining block 194 an underlying face 196 of which is in forced engagement with the upper end of the lip gage 186. As will be hereinafter explained, the lip gage 186, which constitutes a template, is trimmed to the proper shape during the first grooving operation, said lip gage, before it is trimmed, projecting horizontally well beyond the lip 30 of the heel and being of angular construction as shown in dash lines in FIG. 2, the forward face of the lip gage, as the result of the first grooving or breasting operation, being trimmed substantially flush or continuous with the upper portion of the breast of the heel as shown by full lines in FIGS. 2 and 3. It will be noted at this point that the right side (as viewed from the front of the machine) of the abutment 180 has formed in it a recess 198 for receiving the side gage 160 which will be referred to later.

The base plate 164 of the heel holder 162 has secured to it by screws 200 a bearing plate 202 and secured by screws 204 to the lateral upper portions of the bearing plate are guide blocks 206. Slidingly movable on the bearing plate 202 between the guide blocks 206 is an L-shaped slide block 208 secured to the rear end of a piston rod 210. Secured by screws 212 to the upper end of the bearing block 208 is a heel support, cradle or plunger 214 having a bifurcated camming portion 215 adapted to be engaged by the opposite rear lateral side faces of the heel 20 or 24.

As above explained, the abutment 180 has formed in it the recess 198 adapted to receive the side gage 160 as the carrier 46 is swung to a loading and unloading position in which the beam 130 of the carrier is in engagement with the stop 149 as shown in FIGS. 5 and 6, the construction and arrangement being such that when the machine is idle and the heel is placed breast up on the heel support 214, then in its retracted position, the right side of the rim of the attaching face 32 of the heel (as viewed from the front of the machine) is rested against the side gage.

As the piston rod 210 is moved by power, as will be hereinafter explained, to the right (FIG. 2), the heel support or cradle 214 serves to centralize the heel 20 as the rim of the attaching face 32 of the heel is forced against the planar front face 182 of the abutment 180 and simultaneously therewith the lip 30 of the heel is forced against the face 190 of the lip gage 186 to orient said heel with the forward end of the lip of the heel arranged in a horizontal plane. The rim of the attaching face 32 of the heel 20 also engages a front face 216 of the lip gage 186, said front face being continuous with the front face 182 of the abutment, the thin end portion of the lip 30 of the heel being guarded or masked beneath the face 190 of the lip gage. As above explained, the lip gage 186, which may be referred to as a template, originally is L-shaped as shown in dash lines in FIG. 2, and is trimmed during the first trimming operation of a heel of a particular size or style to provide the lip gage 186 which is shown in full lines in FIGS. 2 and 3 and is used in the subsequent grooving of heels of that same style and size.

The piston rod 210 has secured to it a piston 218 mounted for reciprocation in a bore 220 of a cylinder 222 secured by L-shaped brackets 224 to the base plate 164 of the heel holder 162, 162a, said piston being constantly urged forward into engagement with a stop face 226 by a spring 228. The piston 218 is moved rearward in the cylinder 222 against the action of the spring 228 to orient the Louis heel 20, 24 and to clamp it in the holder 162, 162a, by fluid pressure means, for example, air which enters the bore 220 and is available for a face 230 of the piston through a port 232 open to a line 234 connected to a three-way valve 236 receiving high pressure air through a line 238. The valve 236 is secured to an angle plate 240 mounted on a forward threaded projection 242 of the cylinder 222, said plate being clamped to the cylinder by a handle 244 which is threaded onto said projection and is gripped by the operator to swing the carrier 46, 46a, past the tool 42 to groove the heels 20, 24 respectively.

The valve 236 is controlled by a lever 246 which is arranged adjacent to the handle 244 so that it can be readily turned to its full and dash line off and on positions respectively by the thumb of the operator as he grasps the handle. When the lever 246 is in its full line position air from the high pressure line 238 is not available for the line 234 and the heel support or cradle 214 is held in its retracted dash-line position shown in FIG. 2 by the action of the spring 228. Movement of the valve lever 246 to its dash-line position results in high pressure air being available for the face 230 of the piston 218 and the heel support or cradle 214 being moved from its dash-line position to its full-line position shown in FIG. 2 against the action of the spring 228, said cradle cooperating with the abutment 180 and the lip gage 186 in the orienting and clamping of the full Louis plastic heel 20 in the heel holder 162.

In the operation of the machine, the beam 130 of the heel carrier 46 being manually held through the use of the handle 244 by the left hand of the operator in its idle position shown in FIGS. 5 and 6 against the stop 149, the operator manually places with his right hand the Louis heel 20 to be grooved or breasted on the heel support or cradle 214, the rim of the attaching face 32 of the heel engaging the side gage 160. The operator while retaining his righthand grip on the thread end of the heel 20 swings by the use of the thumb of his left hand the valve lever 246. (FIG. 5) from its full-line position to its dash-line position with the result that high pressure air is available for the face 230 of the piston 218, the planar rim of the attaching face 32 of the heel 20 being forced against the front face 182 of the abutment 180 and the forward end of the lip 30 of the heel being forced against the face 190 of the lip gage 186 by reason of the rearward and upward camming action of the bifurcated camming portion 215 of the heel support or cradle 214 against the heel.

The operator then swings the carrier 46 clockwise (as viewed from above) about the axis 48 of the bearing housing 118 causing the upper portion of the breast of the full Louis heel 20, which portion may be described as the breast and shank lip portion of the heel, to move past the tool or cutterhead 40 to form the planar breast 34 of the Continental heel 22 and to form the transversely convex lip 36, lengthwise elements of which are disposed substantially at right angles to said breast.

The depth of the concavity in the attaching face 32 of the full Louis heel 20 or the Continental heel 22 is constant irrespective of the size of the heel. Accordingly it will be appreciated that the smaller the heel the smaller will be the transverse radius of curvature of the forward end of the attaching face of the heel and accordingly the transverse radius of curvature of the upper end of the breast of the heel. In the case of the continental heel 22 the transverse radius of curvature of the convex face 36 will vary with the size of the heel, the smaller the heel the smaller will be the radius of transverse curvature of the face 36. It will thus be clear that in breasting a small heel the distance D between the axis of rotation 48 about which the carrier 46 is rotated and the face 182 of the abutment 180 of the carrier will be relatively small and in a large heel the distance D will be relatively large.

The transverse curvature of the face 36 of the Continental heel may be varied by initially varying the setting of the heel holder 162 of the heel carrier 46 upon the beam 130 of the carrier whereby to vary the distance D between the face 182 of the abutment 180 and the axis of rotation 48 of the beam and accordingly the carrier 46. The distance D may be varied by releasing the screw 174 and sliding the heel holder 162 on the beam 130 until the distance D is that desired to form on the heel a convex face 36 of the proper transverse curvature, the screw then being tightened to secure the holder in its adjusted position on the carrier.

It will be understood that when the heel holder 162 is initially adjusted on the beam 130 it is also necessary to adjust the side gage 160 lengthwise of the gage holder 148 to the proper position to receive the recess 198 of the abutment 180 when the beam of the carrier is swung into engagement with the stop 149. Such adjustment is accomplished by the use of the wing nut 158 which is released to allow the slide 154 to which the side gage 160 is secured to be moved lengthwise of the slot 152 of the heel holder 148.

It will be appreciated that in changing the plastic half Louis heel 24 to a quarter Louis heel 26 the initial setting of the heel holder 162 in the carrier 46 has less significance than in the conversion of a plastic full Louis heel to a Continental heel 22, since the profile cut during the trimming operation is inclined at a slight angle to the horizontal. In styling heels and especially heels greater than quarter Louis heels, however, the forwardly projecting portion of the upper end of the heel breast is sufficiently pronounced so that it is desirable to vary the transverse curvature of the breast of the heel as above explained by varying the setting of the heel holder 162a of the carrier 46 in different initially adjusted positions on the beam 130 of said carrier.

As above explained, it is sometimes desirable to form the quarter Louis heel 26 from the half Louis heel 24 or it may be even desirable to form from the half Louis heel a flat breasted Louis heel (not shown). In forming a quarter Louis heel 26 from a half Louis heel 24 the complete upper forward end of the breast portion of the heel is trimmed from the half Louis heel, the trimming cut "breaking out" at the attaching face of the heel. Accordingly when forming quarter Louis heels 26 it is customary to use the tool or cutterhead 42 such as shown in FIGS. 12 and 13, the cutting edges 68 of the profiling blades 62 of the tool serving to trim material from the upper breast portion of the half Louis heel 24 to form the quarter Louis heel 26 and the cutting edges 70 of the facing blades 64 of the tool trimming along the upper breast edge of the heel to insure that burrs formed by the profiling blades shall be removed from said breast edge. In view of the fact that during the above trimming operation a substantial amount of material indicated by reference numeral M is trimmed from the upper breast portion of the half Louis heel 24 it will be apparent that the heel holder 162 without modifications is not suitable for handling this type of work. The heel carrier 46 may be described as being rotatable about an axis 48 which is oblique to the axis of rotation 44 of the tool 40 and is substantially parallel to the plane of the rim of the attaching face 32 of the heel 20 and which intersects the axis of rotation of the tool at a point on a side of the tool which is opposite from the carrier presenting work to the tool.

To adapt the above machine for changing plastic half Louis heels 24 to quarter Louis heels 26 the machine is provided with the above-mentioned tool or cutterhead 42 and with the modified carrier 46a which comprises the modified heel holder 162a. In the modified heel holder 162a the heel support or cradle 214 is raised to its position shown in FIG. 11 by the insertion of a spacer block 248 between the cradle 214 and the L-shaped slide block 208, and the lip gage 186 and the retaining block 194 are removed from the abutment 180. It will be noted (FIGS. 12 to 15) that the half Louis heel 24 to be trimmed to form the quarter Louis heel 46 has formed at the median longitudinal portion of its attaching face, a pair of cylindrical holes 250 which are of substantial depth and are adapted to receive a pair of pins 252 formed on a plate 254 which fits in the vertically disposed slot 184 formed in the front face 182 of the abutment 180, said plate being secured in said slot by a screw 256 passing through a bore in the abutment and threaded into the plate. To fill spaces, which in the heel holder 162 are occupied by the lateral portions of the lip gage 186, there are provided filler blocks 258 which are secured to the abutment 180 by screws 260 and have front faces 262 which are arranged flush with the front face 182 of the abutment 180.

In operating upon half Louis heels 24 the rim of the attaching face of the heel gripped by the right hand of the operator is forced against the faces 182, 262 of the abutment 180 and the filler blocks 258 respectively, the pins 252 fitting in the holes 250 of the heel and the upper front end of the heel projecting above the blocks as shown in FIG. 11. The operator grips the handle 244 of the carrier 42a with his left hand and moves the valve lever 246 from its full to its dash-line position with the result that the heel support or cradle 214 is forced against the lateral rear portions of the heel to clamp the heel in place on the holder 162a. The carrier is then swung about the axis 48 of the bearing housing 118 causing the heel positioned upon and secured to the holder 162a of the carrier 46a to be moved past the tool or cutterhead 42 causing the above-mentioned material M to be removed from the heel by the profiling cutting blades 62 and causing any burrs, which are formed at the forward end of the attaching face of the heel by the profiling blades, to be removed by the facing blades 64. The carrier 46a is then swung back to its starting position in which its beam 130 engages the stop 160, the valve lever 246 is moved from its dash-line position to its full-line position to release from the carrier, and the heel is manually removed from the machine.

Having thus described my invention, what I claim as new and desire to secure by Letters Patent of the United States is:

1. In a grooving machine, a powered rotary tool, a carrier mounted for swinging movement about a fixed axis, lip and end gages mounted on the carrier and adapted to be engaged respectively by the forward projecting lip of a Louis heel and the rim of the attaching face of the heel, a plunger adapted to be engaged by lateral rear face portions of the heel, power means for moving the plunger toward said gages to force the lip of the heel and the rim of the attaching face of the heel against the lip and the end gages respectively whereby to position the heel and to hold it securely on the carrier, a handle adapted to be gripped by the operator to swing the carrier about its axis and past the tool, and a control member which is arranged adjacent to the handle of the carrier and is adapted to be moved to one position by the operator to cause said power means to move the plunger toward the gages preparatory to swinging the carrier past the tool to groove the molded heel to a predetermined shape.

2. In a machine for grooving plastic Louis heels, a tool rotatable about an axis and constructed and arranged to generate a surface of revolution having a cross section corresponding in part to a combined Louis heel breast and shank-lip profile, a carrier for a molded Louis heel, said carrier comprising a beam mounted for movement about an axis which is oblique to the axis of rotation of the tool and lies in a common plane with said tool axis, a holder which is mounted on the beam and is adapted to support and clamp a heel, means for initially moving the holder into different operating positions on the beam toward and away from said second-named axis, said carrier being movable about said second-named axis to carry the breast and lip portions of the heel past the tool whereby to remove material from said portions to form a heel of a modified style, and means for adjusting the axis of the tool in said plane relative to the axis about which the beam is swung to cause the tool to be positioned properly with respect to the path of movement of the heel in the carrier.

3. In a machine for grooving plastic Louis heels, a rotary tool adapted to generate a surface of revolution having a cross section corresponding in part to a combined heel breast and shank-lip profile, a carrier including a holder comprising a support adapted to be engaged by rear portions of the heel, an abutment adapted to be engaged by the rim of the attaching face of the heel, a lip gage adapted to be engaged by the forward end of the forwardly projecting lip of the heel, and power means for moving the support toward the abutment to force the rim of the attaching face of the heel and the lip of the heel on the holder to be forced respectively against the abutment and the lip gage, said carrier being mounted for swinging movement about an axis which is oblique to the axis of rotation of the heel to carry the heel breast and shank lip portion of the heel past the tool.

4. In a heel grooving machine, a tool rotatable about an axis and adapted to generate a surface of revolution having a cross section corresponding in part to a combined heel breast and shank-lip profile of a molded Louis heel, a carrier including a holder comprising a support adapted to be engaged by rear portions of the heel, an abutment adapted to be engaged by the rim of the attaching face of the heel, a lip gage adapted to be engaged by the forward end of a shank-lip of the heel, and power means for moving the support toward the abutment to cause the rim of the attaching face and the lip of the heel on the holder to be forced respectively against the abutment and the lip gage, said carrier being mounted for swinging movement about an axis which is oblique to the axis of rotation of the tool to carry the heel breast and shank-lip portion of the heel past the tool, means for swinging the tool into different initially adjusted positions in a general plane about an axis which is disposed at right angles to the axis about which the beam is swung, and means for initially adjusting the tool bodily in said plane in rectilinear paths disposed at right angles to each other.

5. In a heel breasting machine, a tool rotatable about an axis and adapted to remove material from the upper breast face of a molded plastic Louis heel to form a Continental heel having a laterally convex shank-lip surface, a holder comprising a support adapted to be engaged by the opposite rear side portions of the plastic Louis heel, an abutment and a lip gage adapted to be engaged respectively by the rim and the front lip of the attaching face of the heel, means for moving the support toward the abutment and the lip gage to cause the heel to be positioned and securely clamped between the support, the abutment and the lip gage, said holder being rotatable about an axis which is oblique to the axis of rotation of the tool whereby to move the heel past the tool, and means for initially moving the holder into different adjusted positions at right angles to the second-named axis whereby to vary the distance between the abutment and the lip gage on the one hand and the second-named axis on the other hand.

6. In a heel grooving machine, a rotary cutting tool, a carrier which comprises a holder and is movable about an axis, means for initially adjusting the holder on the carrier toward and away from said axis, said holder comprising angularly disposed faces adapted to be engaged by the marginal rim and by the front lip respectively of the attaching face of a molded plastic Louis heel, a cradle adapted to be engaged by the opposite rear lateral margins of the heel, and power means adapted to cause the cradle to centralize the heel and to cooperate with said angularly disposed faces to orient and to position the heel and to clamp it securely in the holder, said carrier when moved about its associated axis causing the breast of the heel to be moved past the tool to form on said heel a combined breast and shank-lip portion converting said heel into a heel of a different style.

7. In a heel grooving machine, a rotary cutting tool, a carrier which comprises a holder and is movable about an axis, means for initially adjusting the holder on the carrier toward and away from said axis, said holder comprising angularly disposed faces adapted to be engaged respectively by the marginal rim and the front lip of the attaching face of a molded Louis heel, a cradle adapted to be engaged by the opposite rear lateral margins of the heel, and power means adapted to move the cradle whereby to centralize the heel and to cooperate with said angularly disposed faces to orient and to position the heel and to clamp it securely in the holder, said carrier when moved about its associated axis being adapted to cause the breast and the shank-lip portion of the heel to be moved past the tool to form thereon a breast and shank-lip portion converting said heel into a heel of a different style, a normally fixed side gage adapted to be engaged by the side of the heel placed in the cradle for initially positioning the heel widthwise in the cradle, means for initially adjusting on the carrier the holder into different positions toward and away from the fixed axis, and means for initially adjusting the side gage toward and away from said fixed axis in accordance with the setting of the holder on the carrier.

8. In a heel grooving machine, a cutting tool which is rotatable about an axis and comprises breast trimming blades and facing blades, a carrier comprising a beam mounted for movement about a fixed axis which is oblique to the axis to the rotation of the tool and lies in a common plane with said axis, a holder which is adapted to support and to clamp a molded half Louis heel and which includes an abutment adapted to be engaged by the rim of the attaching face of the heel and having projecting pins adapted to be received in bores formed in the attaching face of said heel, a cradle slidingly mounted on the holder and adapted to be engaged by opposite rear margins of the heel, and power means for causing the cradle to cooperate with said abutment and said pins in the positioning of the heel on and the securing of the heel to the holder with the forward upper end of the heel projecting beyond the abutment, said carrier when moved about the axis of the beam causing the upper forward portion of the heel to be moved past the tool with the result that material is removed by the breast trimming blades from the upper forward portion of the heel whereby to convert said heel to a quarter Louis heel, and a burr extending from the upper forward end of the attaching face of the heel as the result of the cutting action of the breast trimming blades is removed from the heel by the facing blades.

9. In a heel grooving machine, a cutting tool which is rotatable about an axis and comprises breast trimming blades and facing blades, a carrier comprising a beam mounted for movement about a fixed axis which is oblique to the axis to the rotation of the tool and lies in a common plane with said axis, a holder which is adapted to support and to clamp a molded half Louis heel and which includes an abutment adapted to be engaged by the rim of the attaching face of the heel and having projecting pins adapted to be received in bores formed in the attaching face of said heel, a cradle slidingly mounted on the holder and adapted to be engaged by opposite rear margins of the heel, and power means for causing the cradle to cooperate with said abutment and said pins in the positioning of the heel on and the securing of the heel to the holder with the forward upper end of the heel projecting beyond the abutment, said carrier when moved about the axis of the beam causing the upper forward portion of the heel to be moved past the tool with the result that material is removed by the breast trimming blades from the upper forward portion of the heel whereby to convert said heel to a quarter Louis heel, and a burr extending from the upper forward end of the attaching face of the heel as the result of the cutting action of the breast trimming blades is removed from the heel by the facing blades and means for initially moving the holder on the carrier into different adjusted positions toward and away from the axis about which the beam of the carrier is rotated whereby to move the holder into different operating positions on the beam.

10. In a machine for grooving Louis heels, a rotary tool, means for rotating said tool about a fixed axis, a carrier mounted for movement in a predetermined path, said carrier comprising a holder including a planar abutment adapted to be engaged by the rim of the attaching face of a molded half Louis heel which has bores formed in its attaching face, pins projecting from said abutment and adapted to register with the holes in the attaching face of the heel the rim of which is in engagement with the abutment, a cradle adapted to be engaged by the rear lateral faces of a heel, and power means for moving the cradle toward the abutment to position the heel on and to secure it to the holder, said carrier being moved in said path to transfer the breast of the heel past the tool to trim material from the breast of the heel whereby to change the profile of said breast.

11. In a machine for grooving Louis heels, a rotary tool, means for rotating said tool about a fixed axis, a carrier mounted for swinging movement about a fixed axis which lies in a plane including the axis of the tool and is oblique to the axis of the tool, said carrier comprising a holder including a planar abutment adapted to be engaged by the rim of the attaching face of a molded half Louis heel which has bores formed in its attaching face, pins projecting from said abutment and adapted to register with the holes in the attaching face of the heel the rim of which is in engagement with the abutment, a cradle adapted to be engaged by the rear lateral faces of a heel, and power means for moving the cradle toward the abutment to position the heel on and to secure it to the holder, said carrier being movable about its associated axis to transfer the breast of the heel past the tool to trim material from the breast of the heel whereby to change the profile of said breast, and means for moving the positioned heel as a unit on the carrier into different operating positions toward and away from its associated axis in accordance with the desired transverse contour to be imparted to the breast of the heel during the trimming operation.

References Cited by the Examiner
UNITED STATES PATENTS

| | | | |
|---|---|---|---|
| Re. 18,432 | 4/1932 | Day | 12—47.1 |
| 1,773,377 | 8/1930 | Roberts | 12—147 |
| 1,860,789 | 5/1932 | Sawyer | 144—157 |
| 1,897,680 | 2/1933 | Shaw | 12—47.1 |
| 1,963,203 | 6/1934 | Knowlton | 12—47.1 |
| 2,127,208 | 8/1938 | Darragh | 12—147 |
| 2,279,430 | 4/1942 | Winkley | 12—47.1 |
| 2,489,406 | 11/1949 | Elliott | 12—47 |
| 2,530,590 | 11/1950 | White | 12—47 |

JORDAN FRANKLIN, *Primary Examiner.*

DAVID J. WILLIAMOWSKY, *Examiner.*